United States Patent [19]

Bryan et al.

[11] Patent Number: 5,052,091

[45] Date of Patent: Oct. 1, 1991

[54] HYDRAULIC VALVE SPRING COMPRESSOR

[76] Inventors: Kenny L. Bryan; Randy J. Bryan, both of 9909 S. Clegern, Oklahoma City, Okla. 73139

[21] Appl. No.: 564,135

[22] Filed: Aug. 8, 1990

[51] Int. Cl.[5] .............................................. B23P 19/04

[52] U.S. Cl. ...................................................... 29/215

[58] Field of Search ................................. 29/215–221, 29/257, 252; 72/705

[56] References Cited

U.S. PATENT DOCUMENTS

| | | | |
|---|---|---|---|
| 2,509,516 | 5/1950 | Murphy | 29/215 |
| 2,691,209 | 10/1954 | Stearns | 29/215 |
| 2,741,020 | 4/1956 | Arthur | 29/215 |
| 4,555,927 | 12/1985 | Grace | 72/705 |
| 4,654,944 | 4/1987 | Graf | 29/217 |

FOREIGN PATENT DOCUMENTS

| | | | |
|---|---|---|---|
| 163957 | 7/1958 | Sweden | 29/215 |

*Primary Examiner*—Robert C. Watson

[57] ABSTRACT

A valve spring compressor which consists of a round tube steel frame and uses a manually operated lever attached to a master cylinder and slave cylinder hydraulic system which creates the pressure to compress valve springs also a spring seat bracket consisting of a round tube welded to a round disc and allows access to valve locks and valve stems.

1 Claim, 3 Drawing Sheets

HYDRAULIC VALVE SPRING COMPRESSOR

BACKGROUND OF THE INVENTION

1. Field of the Invention

The present Invention relates to valve spring compressors for the purpose of removing or installing valve springs of internal combustion engines and in particular to valve spring compressors using hydraulics to apply force.

2. Prior Art

Current designs of valve spring compressors have work force applied by either a hand operated lever or by a pneumatic piston, operated by hand and powered through an air compressor system.

Common to these designs are a frame consisting of two flat steel members held together by riveted studs, also common to these designs are a spring seat bracket comprised of seperate jaws connected together by a screw.

Examples of such prior art are established in U.S. Pat. Nos. Re. 3,038,247, 3,668,765 and 4,376,331.

SUMMARY OF THE INVENTION

The invention presented here was designed with several improvements over common valve spring compressor designs.

These areas of improvements are; to increase frame stability and strength, without adding weight by using a one piece tube frame made of chromoly seamless tubing which will prevent any frame twisting due to movement of frame members with loose or worn rivets and spacing sleeves, to increase force applied and allow mobility through system self containment, this is accomplished by use of a hydraulic master cylinder which is lever operated by one's leg.

The levers design increases load through mechanical advantage, this activates a slave cylinder attached to the clamp frame and is adjustable for work application, the light weight of these components allow for complete mobility even where utilities aren't available and because activation of said master cylinder is leg operated, this allows the worker to have both hands free while work load is being applied, also increased force is produced by the worker by using his or her leg which has greater strength than the arm does, which will make work easier.

Another improvement was in the spring seat bracket design, commonly comprising a two piece jaw, but when these become worn or when spring tension is extremely high as in high performance springs, the jaws tend to slip off the spring.

Our design corrects this by use of a one piece flat disc which has retaining edges to center it and prevent it from slipping off.

DETAILED DESCRIPTION OF THE INVENTION

Referring to FIGS. 1–7, there is shown one embodiment of this invention wherein a hydraulic valve spring compressor tool 1, consists of a c-shaped frame 2, formed from round tubing which has a spring seat bracket collar 3, at one end, welded thereto and a slave cylinder assembly collar 4, welded to the other end.

Figure 1:
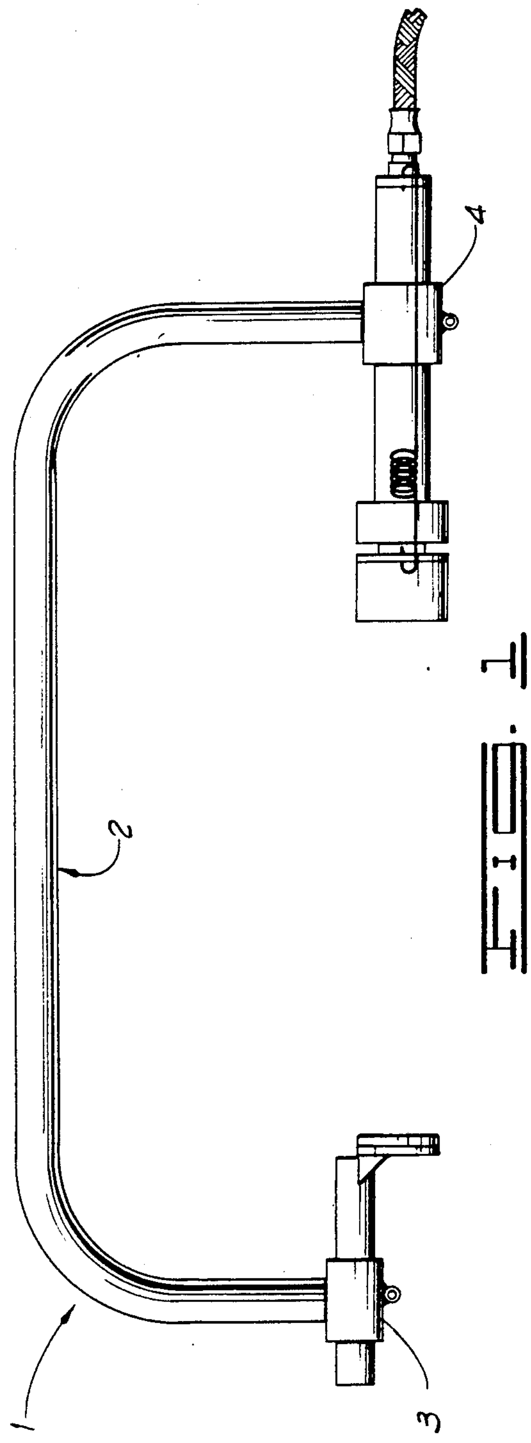
FIG. 1 is a side elevation of the c-frame with slave cylinder assembly and spring seat bracket inplace.
Figure 3:
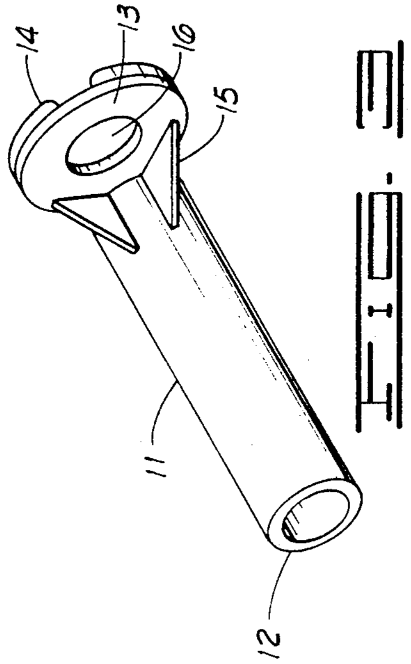
FIG. 3 is a perspective view of a spring seat bracket.
Figure 2:
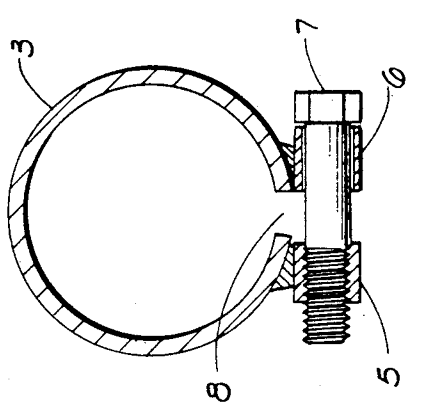
FIG. 2 is a cross-sectional view of a clamping collar.

Collars 3 and 4, as shown in FIG. 2 allow adjustment by means of a gap 8, in the collar and an adjustment tube 6, welded on one side of the gap, and the adjustment boss 5, welded to the other side, the boss is threaded.

When a bolt 7, is placed thru the adjustment tube 6, and threaded into the adjustment boss 5, then the bolt 7, is tightened, this closes the gap 8, and creates a clamping effect on the device it holds.

Figure 5:
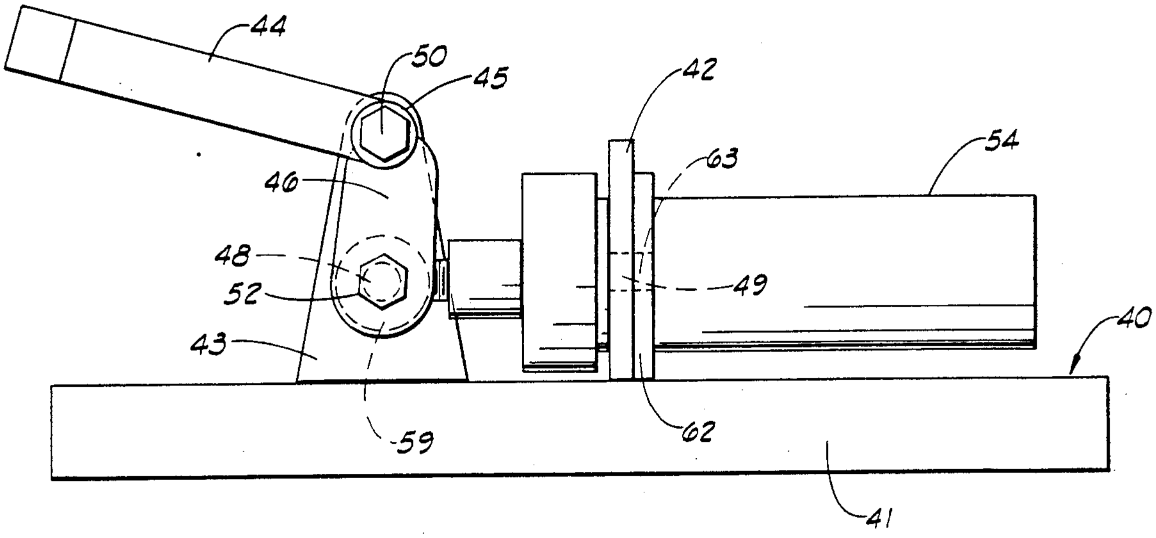
Fig. 5 is a side view of the pedal assembly with the master cylinder in place.

The spring seat bracket 11, shown in FIG. 5, which consists of a tube section 12, welded offset to a flat disc 13, that is strengthened by gussets 15, the flat disc 13, has an access hole 16, for valve stem and valve locks to pass thru and is centered in place by retaining lips 14, which incompass the outside edge of the disc 13, on the side which contacts a valve spring seat, sometimes referred to as a retainer.

Figure 4:
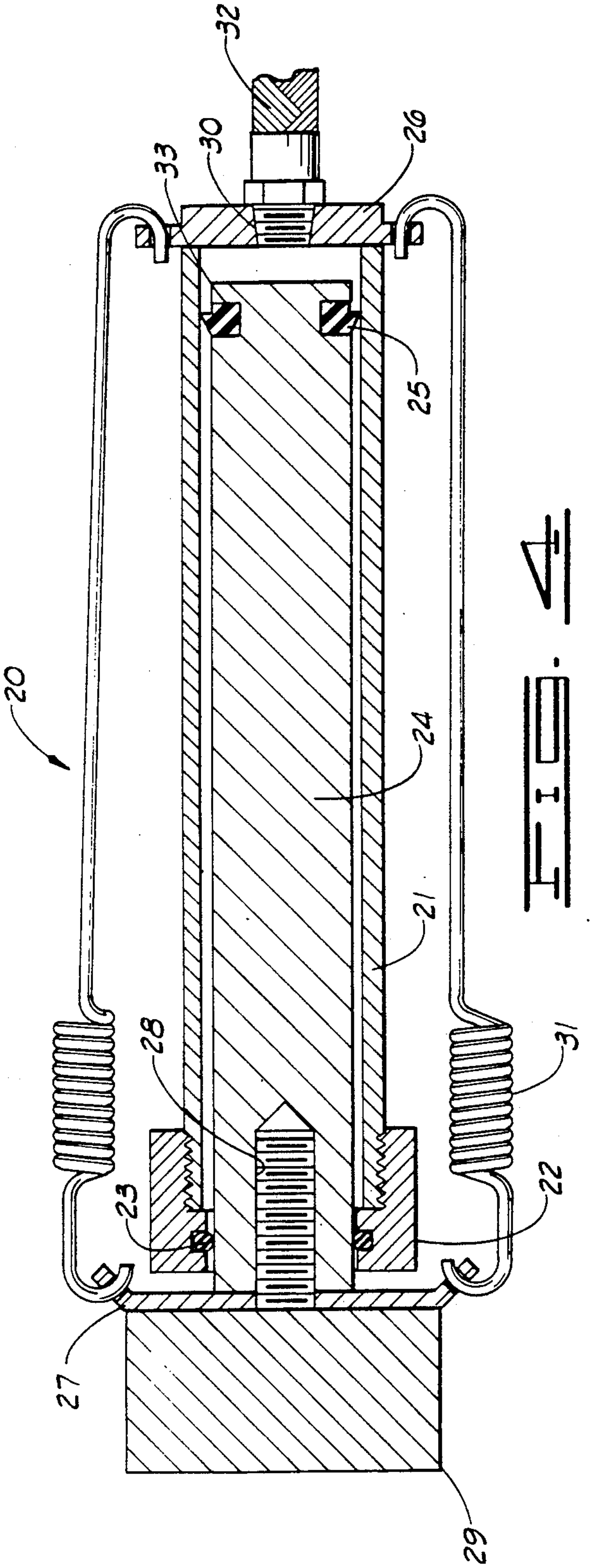
FIG. 4 is a sectional view of the slave cylinder assembly.

The slave cylinder 4, holds the slave cylinder assembly 20, shown in FIG. 4 which consists of a cylinder housing 21, with a cap 22, which is threaded in place. The slave cylinder piston 24, seals to the housing 21, by means of a cupped piston seal 25, which lies in a machined groove 33, in the piston.

The other end of the piston 24, is also sealed and centered by means of an o-ring 23, in the housing cap 22, the piston 24, has a threaded hole 28, which the valve contact head 29, and the front spring plate 27, mounts onto.

A return spring 31, extends form the front spring plate 27, to the rear spring plate 26, there is a return spring 31, on each side of the slave cylinder. The rear spring plate 26, also has a hose connection port 30, which the hydraulic hose assembly 32, threads into allowing fluid transfer to and from the master cylinder assembly 54.

In FIG. 5 we see the master cylinder assembly 54, in place in the master cylinder pedal assembly 40, which consists of a rectangular shaped platform 41, made of angle steel welded together.

Figure 6:
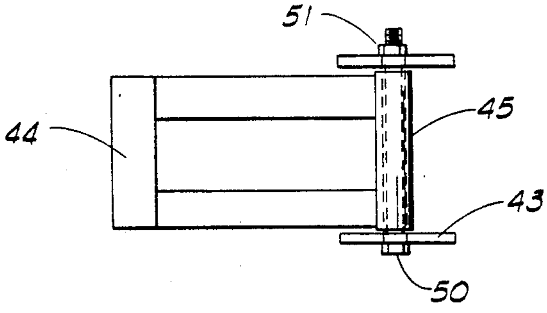
FIG. 6 is an overhead sectional view of the pedal.

The pedal 44, is made of square tube steel and is formed in a rectangular shape with one end having a round tube referred to as the pedal mounting tube 45, which the pedal pivots on and mounts to the pedal hinge plates 43, with a hinge plate on each side of the pedal mounting tube 45, and connecting thereto by means of a bolt 50, passing thru both hinge plates 43, and mounting tube 45, with a nut 51, screwed onto the bolt to secure it in place which is clearly shown in FIG. 6.

At the center point of the mounting tube 45, on the bottom side there are two leverage brackets 46, and are welded in place. These brackets have an attachment hole 48, in which they allow a bolt and nut 52, to be used to connect to the master cylinder linkage 59.

A master cylinder mounting plate 42, is welded upright with a hole in the center, large enough to allow the master cylinder assembly 54, to pass thru so the master cylinder bracket 62, can contact and bolt to the master cylinder mounting plate 42. A bolt passes thru the mounting bracket holes 63, and screw into the threaded holes 49, in the master cylinder mounting plate 42, on the pedal assembly 40.

Figure 7:
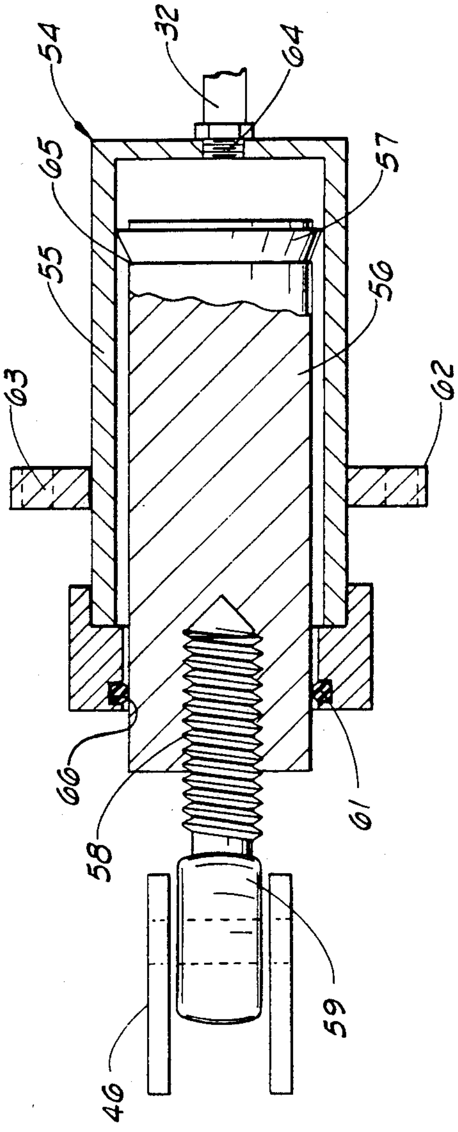
FIG. 7 is an overhead sectional view of the master cylinder assembly, pedal to master cylinder linkage and pedal leverage brackets.

In FIG. 7 we can see the master cylinder assembly 54, consisting of a housing cylinder 55, which is threaded at one end which allows the housing cap 60, to be placed thereon, near the center of the housing we see the mounting bracket 62, and at the closed end of the housing there is a hose connection port 64, which the hose assembly 32, threads into and allows fluid transfer to the slave cylinder assembly 20, inside the housing there is the master cylinder piston 56, which has a cupped seal 57, placed in a machined groove 65.

The cupped seal 57, makes contact with the inside of the housing 55, to seal off the hydraulic fluid and to center that end of the piston 56, at the other end of the piston we see a threaded hole which is the linkage mounting hole 58, the linkage 59, which connects the pedal leverage brackets 46, to the master cylinder piston 56. In the master cylinder cap 60, there is an o-ring 61, which lies in a machined groove 66, this o-ring helps to seal the cylinder and center one end of the piston 56.

What is claimed is:

1. A hydraulic valve spring compressor, comprising a c-shaped frame having a clamping collar at each end as a means of attachment of a hydraulic slave cylinder by inserting the said slave cylinder into the said collar at one end of the frame and a means of attaching a spring seat bracket by being inserted into the said collar at the opposite end of the frame, the slave cylinder having a return spring on each side of it's housing and said springs having a means of attachment to a plate mounted on said slave cylinder's piston, the opposite end of the said springs having a means for and are attached to a plate at the end of the slave cylinder housing, said plate also having a means for connection of a hydraulic hose as a means for fluid transfer from and back to a master cylinder, which also has a means for attachment of the hydraulic hose, the master cylinder has a means for and is attached to a pedal assembly, which has a rectangular shaped platform and a means for mounting the said master cylinder thereon, the said platform also having a means for attachment of a pedal at it's pivot point and said pedal having a means for attachment to said master cylinder's piston, which upon actuation of said pedal, will move the master cylinder's piston to apply compression force inwhich transfers fluid to said slave cylinder to extend the slave cylinder piston, which engages the lower end of a valve, the said spring seat bracket has a tubular section to be inserted into a said clamping collar as a means of attachment to said frame, at the opposite end of the spring seat bracket's tube section there is a flat disc section, which contacts a valve spring retainer during operation, the said disc is attached to the tube section offset and has a hole in it's center, thus allowing a valve stem and locks to pass thru the hole of the disc and not enter the said tube section during the compression operation of a valve spring and allowing access to the said valve stem and locks.

* * * * *